United States Patent
Boughton et al.

(10) Patent No.: US 10,059,614 B2
(45) Date of Patent: Aug. 28, 2018

(54) MELTING GLASS MATERIALS USING RF PLASMA

(71) Applicant: CORNING INCORPORATED, Corning, NY (US)

(72) Inventors: Daniel Robert Boughton, Naples, NY (US); Irene Mona Peterson, Elmira Heights, NY (US)

(73) Assignee: Corning Incorporated, Corning, NY (US)

( * ) Notice: Subject to any disclaimer, the term of this patent is extended or adjusted under 35 U.S.C. 154(b) by 47 days.

(21) Appl. No.: 15/026,112

(22) PCT Filed: Sep. 29, 2014

(86) PCT No.: PCT/US2014/057977
§ 371 (c)(1),
(2) Date: Mar. 30, 2016

(87) PCT Pub. No.: WO2015/050803
PCT Pub. Date: Apr. 9, 2015

(65) Prior Publication Data
US 2016/0244352 A1 Aug. 25, 2016

Related U.S. Application Data (60) Provisional application No. 61/886,519, filed on Oct. 4, 2013.

(51) Int. Cl.
C03B 5/02 (2006.01)
C03B 3/02 (2006.01)
H05H 1/46 (2006.01)

(52) U.S. Cl.
CPC .............. *C03B 5/025* (2013.01); *C03B 3/026* (2013.01); *H05H 1/46* (2013.01); *H05H 2001/4667* (2013.01); *Y02P 40/57* (2015.11)

(58) Field of Classification Search
CPC .......... C03B 5/025; C03B 3/026; H05H 1/46; H05H 2001/4667; Y02P 40/57
See application file for complete search history.

(56) References Cited

U.S. PATENT DOCUMENTS

| | | | |
|---|---|---|---|
| 3,859,070 A | * | 1/1975 | Slonaker ............. C03B 37/0805 65/493 |
| 4,202,682 A | | 5/1980 | Black |

(Continued)

FOREIGN PATENT DOCUMENTS

| | | |
|---|---|---|
| CN | 102786201 A | 11/2012 |
| JP | 2003212572 A | 7/2003 |

(Continued)

OTHER PUBLICATIONS

C . K . Gupta and D . Sathiyamoorthy , Fluid Bed Technology in Materials Processing, CRC Press 1998, DOI: 10.1201/9781420049862.ch4, p. 271-340.

(Continued)

*Primary Examiner* — Nahida Sultana (57) ABSTRACT

The disclosure relates to methods for forming pre-melting and/or melting glass batch materials comprising bringing glass batch materials into contact with a plasma plume for a residence time sufficient to form substantially homogeneous, spheroid-shaped glass intermediate particles. The glass batch materials may flow in a cyclonic pattern in the plasma plume for increased residence time. The glass intermediate particles may be cooled with a tangential flow of gas to produce a cyclonic flow within the collection vessel. Also disclosed herein are glass intermediate particles comprising at least about 45 wt % of alumina and/or silica and less than about 55 wt % of at least one oxide of boron, V magnesium, calcium, sodium, strontium, tin, and/or titanium, wherein the glass intermediate particles are substantially homogenous (Continued)

and substantially spheroid in shape and have an average particle size ranging from about 5 to about 1,000 microns.

20 Claims, 1 Drawing Sheet

(56) References Cited

U.S. PATENT DOCUMENTS

| | | | |
|---|---|---|---|
| 5,028,248 | A | 7/1991 | Williams et al. |
| 5,312,471 | A * | 5/1994 | Jung ................. C03B 5/025 373/20 |
| 6,428,600 | B1 | 8/2002 | Flurschutz et al. |
| 8,544,298 | B2 * | 10/2013 | Sakamoto ............. C03B 3/026 65/135.6 |
| 8,883,110 | B2 | 11/2014 | Ueda |
| 9,166,170 | B1 * | 10/2015 | Perry ................... C09C 3/063 |
| 9,352,278 | B2 * | 5/2016 | Spatz ................. B01J 37/082 |
| 9,901,975 | B2 * | 2/2018 | Deters ................... B22C 1/02 |
| 2003/0027054 | A1 | 2/2003 | Ball et al. |
| 2004/0050098 | A1 | 3/2004 | Ball et al. |
| 2004/0148966 | A1 * | 8/2004 | Celikkaya .............. B24D 3/00 65/17.4 |
| 2005/0056055 | A1 | 3/2005 | Celikkaya et al. |
| 2005/0132655 | A1 | 6/2005 | Anderson et al. |
| 2008/0041103 | A1 * | 2/2008 | Kramlich ............ C03B 19/102 65/17.3 |
| 2009/0064716 | A1 | 3/2009 | Sakamoto et al. |

FOREIGN PATENT DOCUMENTS

| | | |
|---|---|---|
| JP | 2004124231 A | 4/2004 |
| JP | 03639279 B2 | 4/2005 |
| JP | 04239145 B2 | 3/2009 |
| JP | 2013082591 A | 5/2013 |
| WO | 2010071143 A1 | 6/2010 |
| WO | 2012043484 A1 | 4/2012 |
| WO | 2013125541 A1 | 8/2013 |

OTHER PUBLICATIONS

International Preliminary Report on Patentability; dated Apr. 14, 2016; 12 Pgs; The IB of WIPO.

International Search Report; International Seracing Authority; dated Jan. 16, 2015; 14 Pgs; KIPO.

Kawaguchi, Masataka; Kato, Tsutomu; Imamura, Yukinobu; Yoshida, Noriyuki, Aoki, Shigeaki; Challenge to Improve Glass Melting and Fining Process. Ceramics—Silikáty 2008, 5,2 (4) 217-224.

Nimec, Lubomir; Glass Melting and its Innovation Potentials: Bubble Removal Under the Effect of Centrifugal Force. Ceramics—Silikáty 2008, 52, (4), 225-239.

Yao, Science and Technology of Advanced Materials; An innovative energy-saving in-flight melting technology and its application to glass production 2008, (9), 1-8.

Seo, J. H., Kim, D. U., Nam, J. S., Hong, S. H., Sohn, S. B., & Song, S. M. (2007). Radio frequency thermal plasma treatment for size reduction and spheroidization of glass powders used in ceramic electronic devices. Journal of the American Ceramic Society, 90(6), 1717-1722.

Yan, S., Hu, P., Yuan, F., & Li, J. Spheroidization of silica powders in a radio frequency plasma. Cailiao Gongcheng (Journal of Materials Engineering), 2006, (2), 29-33.

Fuji Funabiki, etal. "In-flight-melted soda-lime-silica glass by RF induction thermal plasma", J. Am. Ceram. Soc. Journal.

Yaochun Yao, et al. "Application of in-flight melting technology by RF induction thermal plasmas to glass production", Plasma Science and Technology. Journal.

Yaochun Yao, et al. "Effects of feed rate and particle size on the in-flight melting behavior of granulated powders in induction thermal plasmas", Science Direct. Journal.

Yaochun Yao, et al. "In-flight melting of granulated powders in thermal plasmas for glass production", Transactions of the Materials Research Society of Japan. Journal.

Yaochun Yao, et al. "Investigation on in flight melting behavior of granulated alkall-free glass raw material under different conditions with 12-phase AC arc", Chemical Engineering Journal. Journal.

Yaping Liu, et al. "In flight melting behavior of different glass raw materials by hybrid heating of twelve phase AC arc oxygen burner", Thin Solid Films. Journal.

English Translation of CN2017110100320990 First Office Action dated Nov. 6, 2017, China Patent Office, 5 pgs.

English Translation of JP2016519761 Office Action dated Jun. 19, 2018, Japan Patent Office, 4 pgs.

Fokin et al. "homogeneous nucleation versus glass transition temperature of silicate glasses", Journal of Non-Crystalline Solids 321 (1-2) Jul. 2003, pp. 52-65.

* cited by examiner

MELTING GLASS MATERIALS USING RF PLASMA

CROSS-REFERENCE TO RELATED APPLICATIONS

This application claims the benefit of priority under 35 U.S.C. § 119 of U.S. Provisional Application Ser. No. 61/886,819 filed on Oct. 4, 2013, the entire content of which is hereby incorporated by reference.

FIELD OF THE DISCLOSURE

The present disclosure relates generally to methods for pre-melting, melting, and/or processing glass batch materials, and more particularly to processing glass precursor materials using dielectric or radio frequency ("RF") plasma.

BACKGROUND

Glass substrates may be used in a variety of applications, ranging from windows to high-performance display devices. The quality requirements for glass substrates have become more stringent as the demand for improved resolution, clarity, and performance increases. Glass quality may, however, be negatively impacted by various processing steps, from forming the glass melt to final packaging of the glass product.

One processing step that may result in reduced glass quality is the melting process, wherein glass precursor batch materials are mixed and heated in a melter. During this process, the materials melt and react, giving off reaction gases, which produce bubbles in the molten glass. Additionally, the melting process may produce an inhomogeneous glass melt having regions with differing chemical compositions. The first melt to form is often highly reactive with the refractory materials, which may lead to excessive wear of the apparatus and/or defects in the glass melt. Denser portions of the melt may also sink to the bottom of the melter, leading to a "sludge" layer which has different optical properties than the rest of the melt and is difficult to completely mix back into the overall melt, which results in inhomogeneous portions of the melt, referred to in the art and herein as "chord." Finally, due to the typically large processing volume, it is possible that various glass batch materials may not melt or may only partially melt. The un-melted or partially melted materials are carried through the melting process and may later become defects in the glass product.

Current melting processes for producing high quality optical glass utilize high temperatures and stirring to remove bubbles from the glass melt. However, such processes may be cost prohibitive, as they require expensive metals and specially designed high temperature refractory materials for the processing equipment. Further, these costly melting systems require a long processing time and high energy expenditure as the reaction gases have a long distance to travel to escape the glass melt and the sludge layer must be mixed from the bottom of the melter tank into the rest of the glass melt in the tank, requiring a mixing motion over a long distance through a highly viscous fluid.

Alternative methods for preventing glass bubbles and inhomogeneous portions in the glass melt include processing the melt in smaller batches. In this manner, the gas bubbles have a shorter distance to travel to escape the melt and the sludge layer can be more easily incorporated into the rest of the melt. However, as with many small scale processes, these methods have various drawbacks such as increased processing time and expense.

Significant issues have also been observed when trying to melt various "unconventional" glass precursor materials. For example, glass batch materials comprising a mixture of barium oxide and alumina or a mixture of calcium oxide and alumina may have extremely high melting temperatures, e.g., above 2,100° C., which complicates the melting process and makes it difficult to achieve a homogeneous glass melt. Other glass batch materials, such as mixtures of silica, sodium oxide and calcium oxide can be melted, but have a tendency to crystallize upon cooling, and require special quenching methods to reduce the possibility for processing defects. Ultra-low expansion (ULE®) glasses comprising silica and low levels of titanium dioxide may also present difficulties when melted using traditional processes.

Accordingly, it would be advantageous to provide glass melting processes which are faster and/or more economical, while also minimizing issues relating to glass quality, such as defects caused by bubbles, chord, and/or striae in the melt, and which may be suitable for melting unconventional glass materials. The resulting glass substrates can possess high optical qualities and can be used in various commercial products requiring glass with high resolution, clarity, and/or performance.

SUMMARY

The disclosure relates, in various embodiments, to methods for pre-melting and/or melting glass batch materials, comprising bringing the glass batch materials into contact with a plasma for a residence time sufficient to form substantially homogeneous, spheroid-shaped glass intermediate particles. In certain embodiments, the glass intermediate particles may comprise at least about 45 wt %, for example from about 45 to about 95 wt %, of alumina and/or silica, and less than about 55 wt %, for example from 5 to 55 wt %, of at least one oxide of boron, magnesium, calcium, sodium, strontium, tin, and/or titanium. The glass intermediate particles may have an average particle size ranging from about 5 to about 1,000 microns. In further embodiments, the glass intermediate particles may be cooled by a tangential flow of gas after contact with the plasma and/or may be further melted and/or fused using a traditional melter.

Also disclosed herein is a glass intermediate particle comprising at least about 45 wt %, for example from about 45 to about 95 wt %, of alumina and/or silica and less than about 55 wt %, for example from 5 to 55 wt %, of at least one oxide of boron, magnesium, calcium, sodium, strontium, tin, and/or titanium, wherein the glass intermediate particle is substantially homogenous and substantially spheroid in shape and has an average particle size ranging from about 5 to about 1,000 microns.

Additional features and advantages will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present various embodiments, and are intended to provide an overview or framework for understanding the nature and character of the invention as it is claimed. The accompanying drawings are included to provide a further understanding, and are incorporated into and constitute a part of this specification. The drawings illustrate various embodiments and together with the description serve to explain the principles and operations of the invention.

BRIEF DESCRIPTION OF THE DRAWING

The following detailed description can be best understood when read in conjunction with the following drawing, where like structures are indicated with like reference numerals and in which.

DETAILED DESCRIPTION

Figure 1:
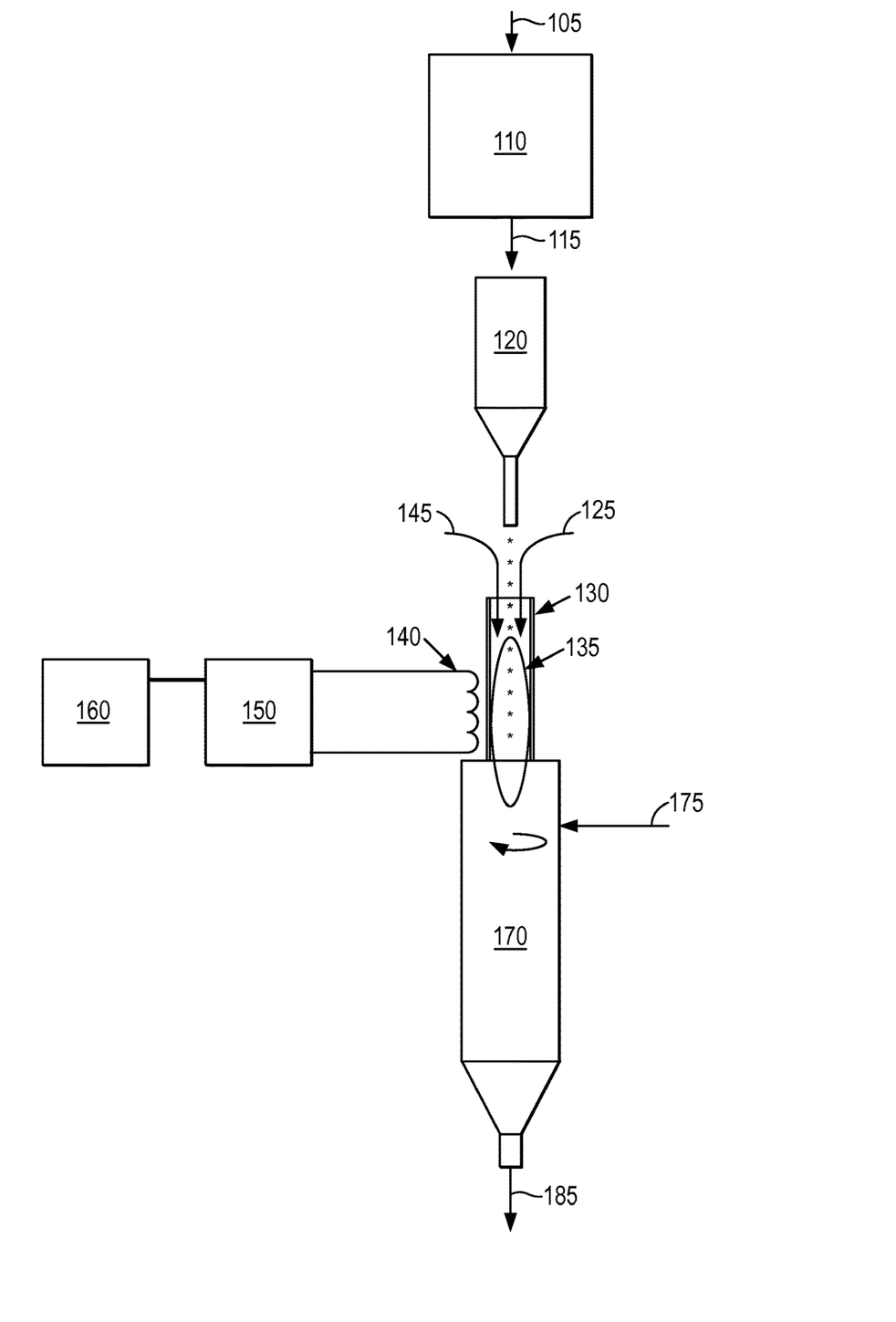
The FIGURE is a schematic illustration of a system for melting glass batch materials according to one embodiment of the disclosure.

Disclosed herein are methods for pre-melting and/or melting glass batch materials, comprising bringing the glass batch materials into contact with a plasma for a residence time sufficient to form substantially homogeneous, spheroid-shaped glass intermediate particles.

Materials

The term "glass batch materials" and variations thereof are used herein to denote a mixture of glass precursor particles which, upon melting, react and/or combine to form a glass. The glass batch materials may be prepared and/or mixed by any known method for combining the glass precursor particles. For example, in certain non-limiting embodiments, the glass batch materials comprise a dry or substantially dry mixture of glass precursor particles, e.g., without any solvent or liquid. In other embodiments, the glass batch materials may be in the form of a slurry, for example, a mixture of glass precursor particles in the presence of a liquid or solvent.

According to various embodiments, the glass batch materials may comprise glass precursor materials, such as silica, alumina, and various additional oxides, such as boron, magnesium, calcium, sodium, strontium, tin, or titanium oxides. For instance, the glass batch materials may be a mixture of silica and/or alumina with one or more additional oxides. In various embodiments, the glass batch materials comprise from about 45 to about 95 wt % collectively of alumina and/or silica and from about 5 to about 55 wt % collectively of at least one oxide of boron, magnesium, calcium, sodium, strontium, tin, and/or titanium.

For instance, ULE® glasses may comprise silica, for instance from about 85 to about 95 wt % silica, and from about 5 to about 15 wt % titanium oxide, or greater than about 90 wt % silica and less than about 10 wt % titanium oxide. These ULE® glasses may include hydroxyl groups (—OH) and various additional elements, such as Nb, Ta, F, and Al. For instance, the ULE® glasses may include less than about 5 wt % of such additional elements. In certain embodiments, the ULE® glass may include such elements in an amount ranging from about 0.1 to about 5 wt %, such as from about 0.5 to about 3 wt %, or from about 1 to about 2 wt %.

Other unconventional glasses may be produced from batch materials comprising a mixture of alumina and barium oxide, such as a mixture comprising at least about 50 wt % alumina and less than about 50 wt % barium oxide, for example, a mixture comprising from about 50 to about 75 wt % alumina and from about 25 to about 50 wt % barium oxide, or a mixture of about 67 wt % alumina and about 33 wt % barium oxide. Similar mixtures comprising alumina and calcium oxide may also be used as glass batch materials, for instance, a mixture comprising from about 70 to about 80 wt % alumina and from about 20 to about 30 wt % calcium oxide. Further unconventional glass batch materials may comprise a mixture of silica, sodium oxide, and calcium oxide. By way of non-limiting example, the glass batch materials may comprise at least about 45 wt % silica and less than about 55 wt % sodium and calcium oxides, for instance, a mixture comprising about 49-52 wt % silica, about 16-21 wt % sodium oxide, and about 28-32 wt % calcium oxide, or a mixture comprising about 50 wt % silica, about 18-20 wt % sodium oxide, and about 30-32 wt % calcium oxide.

In certain non-limiting embodiments, the batch materials comprise less than about 55 wt % of at least one oxide of boron, magnesium, calcium, sodium, strontium, tin, and/or titanium, for example, less than about 50 wt %, less than about 45 wt %, less than about 40 wt %, less than about 35 wt %, less than about 30 wt %, less than about 35 wt %, less than about 20 wt %, less than about 15 wt %, less than about 10 wt %, or less than about 5 wt %, relative to the total weight of the glass batch materials, including all ranges and sub-ranges therebetween. By way of non-limiting example, the glass batch materials may comprise less than 55, 50, 45, 40, 35, 30, 25, 20, 15, 10, or 5 wt % of boron oxide, including all ranges and sub-ranges therebetween. Alternatively, the glass batch materials may comprise less than 55, 50, 45, 40, 35, 30, 25, 20, 15, 10, or 5 wt % of magnesium oxide, including all ranges and sub-ranges therebetween. In other embodiments, the glass batch materials may comprise less than 55, 50, 45, 40, 35, 30, 25, 20, 15, 10, or 5 wt % of calcium oxide, including all ranges and sub-ranges therebetween. According to further embodiments, the glass batch materials may comprise less than 55, 50, 45, 40, 35, 30, 25, 20, 15, 10, or 5 wt % of sodium oxide, including all ranges and sub-ranged therebetween. In yet further embodiments, the glass batch materials may comprise less than 55, 50, 45, 40, 35, 30, 25, 20, 15, 10, or 5 wt % of strontium oxide, including all ranges and sub-ranges therebetween. In still further embodiments, the glass batch materials may comprise less than 55, 50, 45, 40, 35, 30, 25, 20, 15, 10, or 5 wt % of tin oxide, including all ranges and sub-ranges therebetween. According to other embodiments, the glass batch materials may comprise less than 55, 50, 45, 40, 35, 30, 25, 20, 15, 10, or 5 wt % of titanium oxide, including all ranges and sub-ranges therebetween. It is to be understood that various mixtures of oxides described above may be used, with the total amount of the at least one oxide being less than about 55 wt %. By way of non-limiting example, a mixture of sodium and calcium oxides may be used, or a combination of titanium and sodium oxides may be used, or a combination of magnesium, sodium, and calcium oxides may be used, and so forth.

The silica and/or alumina may be present in a combined amount of at least about 45 wt % of the glass batch materials, for instance, at least about 50 wt %, at least about 55 wt %, at least about 60 wt %, at least about 65 wt %, at least about 70 wt %, at least about 75 wt %, at least about 80 wt %, at least about 85 wt %, at least about 90 wt %, or at least about 95 wt %. According to certain embodiments, the glass batch materials may comprise at least about 45, 50, 55, 60, 65, 70, 75, 80, 85, 90, or 95 wt % of silica. In other embodiments, the glass batch materials may comprise at least about 45, 50, 55, 60, 65, 70, 75, 80, 85, 90, or 95 wt % of alumina. It is to be understood that mixtures of silica and alumina in the amounts indicated above may also be used, with the combined amount of silica and alumina being greater than about 45 wt %.

It is also envisioned that additional glass batch compositions which may require elevated melting temperatures and/or which may have other processing difficulties similar to those described above can be used as the glass batch materials processed in the methods described herein. For instance, glass batch compositions comprising silicon nitride, silicon carbide, zirconia, and other oxides with high melting temperature may be suitable for processing according to the methods described herein. High performance optical glasses, such as EAGLE XG® from Corning Incorporated, may also be processed according to the methods described herein.

The glass batch materials may be prepared by any method known in the art for mixing and/or processing glass batch materials. For instance, the batch materials may be mixed, milled, ground, and/or otherwise processed to produce a desired mix with a desired size and/or shape. For example, the glass batch materials may have an average particle size of less than about 1,000 microns, for instance, less than about 900, 800, 700, 600, 500, 400, 300, 200, or 100 microns, and all ranges and sub-ranges therebetween. In various embodiments, the glass batch materials can have an average particle size ranging from about 5 microns to about 1,000 microns, such as from about 50 microns to about 900 microns, from about 100 microns to about 800 microns, from about 150 microns to about 700 microns, from about 200 microns to about 600 microns, or from about 250 microns to 500 microns, and all ranges and sub-ranges therebetween. In further embodiments, the average particle size of the glass batch materials may range from less than about 100 microns, such as less than about 50 microns, less than about 25 microns, or less than about 10 microns.

Methods

According to various embodiments disclosed herein, the glass batch materials are brought into contact with a plasma. As used herein, the terms "contact" and "contacted" and variations thereof are intended to denote the physical and/or thermal interaction of the glass batch materials with the plasma. For instance, the glass batch materials may be physically introduced into the plasma and/or the glass batch materials may come into thermal contact with the plasma, e.g., the heat produced by the thermal plasma.

The glass batch materials may be introduced into the plasma plume using a batch feeder. For example, the batch feeder may comprise a screw feeder equipped with an auger and/or nozzle which dispenses the batch materials. In certain non-limiting examples, the batch feeder may dispense at least about 1 gram of glass batch material per turn of the screw. The glass batch materials may be dispensed into a sifter canister or similar apparatus, in which any agglomerates in the batch materials are broken up. For instance, a sifter canister may comprise a chamber containing stainless steel balls and the canister may be shaken and vibrated at a frequency (e.g., 14.5 kHz), such that the steel balls break apart any agglomerates in the batch materials. The batch materials may, in certain embodiments, flow through the openings in the canister in a dispersion stream to the plasma torch. For example, the batch materials may flow at a rate of at least about 1 gram per minute into the plasma torch, such as, at least about 2 g/min. In certain embodiments, the flow rate may range from about 1 g/min to about 700 g/min or, stated otherwise, greater than about 1 metric ton per day. In certain embodiments, the sifter canister may be flooded with an inert gas, such as argon, to prevent the introduction of atmospheric gasses into the plasma torch.

The glass batch materials may be introduced into the plasma plume optionally in the presence of a stream of gas which may, in various embodiments, be chosen from oxygen, purified and dehumidified ambient air, and inert gases such as nitrogen, argon, helium, and mixtures thereof. The glass batch materials may be entrained in the gas stream such that the particles are floating freely within the stream of gas.

The gas stream may be at ambient temperature or it may optionally be heated. The feed rate of the gas stream may range, for example, from about 1 SLPM to about 150 SLPM, for example, from about 10 SLPM to about 100 SLPM, or from about 25 to about 50 SLPM, including all ranges and sub-ranges therebetween. It is within the ability of one skilled in the art to select the flow rate appropriate for the desired operation and result.

According to various embodiments, the glass batch materials are rapidly heated and melted by contact with the plasma plume. The plasma plume may be envisioned as having a substantially cylindrical or slightly conical shape, with a given length and a circular cross-section. The circular cross-section is defined by the center, or core, and various concentric rings or sheaths. The temperature of the plasma plume may thus be described as a cross-sectional gradient, where the core of the plasma plume can have a temperature of at least about 11,000K and the outer sheath or outer edge of the plasma plume stream may have a relatively lower temperature of at least about 300K. For instance, the core may have a temperature ranging from about 9,000K to about 11,000K and the outer sheath may have a temperature ranging from about 300K to about 1,000K, such as from about 300K to about 500K. The plasma plume may be generated using various heating methods, for example, dielectric (RF) field ionization and direct current (DC) arc methods, and combinations thereof.

The glass batch materials, upon introduction into the plasma plume, may flow in any direction, such as a substantially vertical direction, e.g., dropping along the length of the plasma plume, or they may flow in a cyclonic pattern along the length of the plume. By way of non-limiting example, a second stream of gas may be introduced into the plasma vessel, in a direction tangential to the flow of the plasma plume. The angle of introduction may vary depending on the apparatus, but may generally range from about 15° to about 90°, relative to the flow of the plasma, e.g., relative to the flow along the length of the plasma plume. The cyclonic flow within the plume serves not only to lengthen the residence time of the glass batch materials in the plasma but also generates a centrifugal force which drives the glass batch materials to the cooler outer edges of the plasma plume in such applications where lower melting temperatures are desired. Once the glass batch materials achieve the desired level of melting, either the gravitational force and/or the cyclonic action, together with the velocity of the plasma plume, may drive the particles out of the plasma plume and into a collection chamber.

The glass batch materials contact the plasma for a residence time sufficient to melt and/or react the batch materials. As used herein, the term "react" and "reaction" and variations thereof are intended to denote the interactions of the glass batch materials during heating including, but not limited to, combustion of organic and inorganic materials, evaporation of water, crystallization reactions and inversions, and melting reactions. According to various embodiments, the residence time within the plasma plume may be less than about 10 seconds, for instance, less than about 5 seconds, less than about 1 second, less than about 0.5 seconds, or less than about 0.1 seconds. In other embodiments, the rapid heating of the glass batch materials may occur within milliseconds, for example, the time period may range from about 0.01 to about 0.09 seconds. In certain non-limiting embodiments, the plasma plume heats the glass batch materials to a temperature ranging, for example, from about 300° C. to about 3,000° C., such as from about 500° C. to about 2,500° C., from about 800° C. to about 2,000° C., or from about 1,000° C. to about 1,500° C., including all ranges and sub-ranges therebetween.

According to various embodiments, after a sufficient residence time in the plasma plume, the glass intermediate particles may be collected and optionally further processed. For instance, the glass intermediate particles may be collected and/or cooled upon exiting the plasma plume. In certain embodiments, the glass intermediate particles may pass into a collection chamber, where an optional third gas stream may be introduced in a direction tangential to the flow of glass intermediate particles. The angle of introduction may vary depending on the apparatus, but may generally range from about 15° to about 90°, relative to the flow of the particles. The tangential gas flow within the collection chamber serves to cool and/or quench the glass batch materials as they exit the plasma plume. Once the glass batch materials achieve a desired level of cooling, they may either be collected and/or optionally further cooled and/or quenched.

Alternatively, the glass intermediate particles, after optional cooling, may be fed into a melting tank, where they may optionally be further heated so as to combine the particles with each other to produce a substantially homogeneous glass melt. Such additional melting may be carried out using any method known in the art including, but not limited to, introducing the intermediate particles into a melter and heating with or without stirring.

Without wishing to be bound by theory, in at least certain embodiments, it is believed that the use of a plasma plume will rapidly heat the glass batch materials such that they form glass intermediate or "pre-melt" particles that are homogenously melted and substantially free of reaction gases. It is also believed that the rapid heating, combined with their relatively small average particle size of the glass batch materials, allows any trapped gasses within the glass intermediate particles to quickly reach the surface and exit the pre-melt particles. Furthermore, the rapid heating allows the glass batch materials to melt homogenously, thus avoiding or reducing the formation of a sludge or chord layer having a different makeup or composition. Finally, the ability to rapidly cool the glass intermediate particles upon exiting the plasma may be beneficial for unconventional glass materials that tend to crystallize upon cooling and may reduce or eliminate the need for specialized quenching steps.

Apparatus

The FIGURE illustrates an exemplary system operable for carrying out a method according to the present disclosure. In this embodiment, glass precursor particles 105 are introduced into a batch feeder and/or mixer 110, where they are mixed and fed into a batch sifter 120, where any agglomerates are broken up. The glass batch materials 115 (the flow of which is also illustrated by the * symbol) are then introduced into the plasma containment vessel 130. The glass batch materials 115 may be entrained in the plasma gas 125, which is also introduced into the plasma containment vessel 130. In certain embodiments, the plasma containment vessel 130 may comprise an interior region, comprising the plasma plume 135, and an exterior region, which may comprise a shield gas 145 for purposes of cooling the walls of the interior region. An RF coil 140 is disposed around the plasma containment vessel 130 and is attached to an RF plasma generator 160 by way of an RF plasma matchwork 150. The RF plasma generator 160 serves to convert the plasma gas 125 into a plasma plume 135. The glass batch materials 115 are introduced into the plasma containment vessel 130 at the center of the plasma plume 135, where they are heated to form glass intermediate particles 185. The intermediate particles 185 are then collected in a collection vessel 170. A tangential flow of gas 175 may be used to cool the intermediate particles 185 and/or to induce a cyclonic flow within the collection vessel 170. After collection, the glass intermediate particles 185 may be subjected to additional, optional processing steps.

The apparatuses described herein may employ, in various embodiments, a plasma plume produced by RF inductively coupled plasma (ICP). In other embodiments, the plasma plume may be produced by a combination of RF ICP and DC non-transferrable arc plasma, also referred to as "hybrid plasma." RF induction typically provides a large volume of plasma, but the plasma may be highly turbulent. The DC arc plasma, on the other hand, tends to be more stable, having a substantially cylindrical/conical shape, but has a relatively small volume. Without wishing to be bound by theory, it is believed that the DC arc plasma may serve to stabilize the RF plasma and provide it with a substantially cylindrical cone shaped plume, while still maintaining a high volume of plasma.

An RF induction coil is disposed around the plasma containment vessel and connected to an RF matchwork for impedance matching and an RF generator. The RF generator may produce power at a frequency ranging from about 400 kHz to about 5.8 GHz. For instance, RF frequencies include 6.78 MHz, 13.56 MHz, 27.12 MHz, and 40.68 MHz, and microwave frequencies include 2.441 GHz and 5.800 GHz. For lower frequencies in the kHz range, a high frequency (>1 MHz) excitation may first be used, followed by the use of low frequency to maintain and operate the plasma. The RF generator power level may range from about 10 kW to about 1 MW, depending on the operation cost and throughput requirements. For example, the power level may range from about 50 kW to about 500 kW, or from about 100 kW to about 300 kW, including all ranges and sub-ranges therebetween.

The plasma containment vessel is advantageously constructed out of a corrosion-resistant material, such as a high temperature ceramic material with high dielectric strength. The containment vessel may, in certain embodiments, comprise concentric interior and exterior chambers. Surrounding the interior chamber, the exterior chamber may comprise an annulus of shield gas jets, which may be used for cooling the walls of the interior chamber. The shield gas jets may also provide additional plasma gas components to increase the plasma temperature, such as helium, argon, oxygen, or nitrogen.

In other embodiments, to increase residence time, an additional induction coil may be utilized to extend the length of the plasma. In such instances, the additional coil may be wrapped around the plasma containment vessel, which is coupled to an induction heating generator. The generator may operate at lower frequencies, such as less than 1 MHz, for example, 450 kHz, and a power rating ranging from about 10 kW to about 100 kW. Additional tangential inlets for the second gas may be included in the plasma delivery vessel to keep the cyclonic flow going down the length of the plasma plume.

The plasma containment vessel may have any shape or dimension and, in certain instances, may be tubular in shape. The plasma delivery vessel may advantageously be constructed of a durable material, such as 316 stainless steel or silicon nitride $S_3N_4$. A water cooling jacket may be disposed around the outside of the plasma containment vessel, which may serve to keep the boundary region between the plasma plume outer edges and the vessel at a lower temperature. The containment vessel may also be fitted with a guide tube, which may be used to introduce the glass batch materials into the plasma plume. For instance, the guide tube may be constructed of durable, heat-resistant materials such as platinum and rhodium, such as an 80/20 mixture of platinum and rhodium, or silicon nitride $S_3N_4$.

The RF coil disposed around the plasma containment vessel may, in certain embodiments, be constructed of copper optionally plated with silver. The induction coil may, in various embodiments, wrap around the vessel at least about 3 times, for example, at least about 4 times. Cooling water may flow through the coil to reduce the amount of heat the coil may absorb from the containment vessel. The RF current flowing in the coil produced a magnetic field perpendicular to the turns of the coil, with the field lines concentrating inside the plasma containment tube. This magnetic field reverses and collapses rapidly to produce a current flowing in a continuous circular path or short circuit. For instance, the magnetic field may collapse approximately every 74 nanoseconds (corresponding to a frequency of 13.56 MHz), about every 37 nanoseconds (corresponding to a frequency of 27.12 MHz), about every 25 nanoseconds (corresponding to a frequency of 40.68 MHz), about or every 17 nanoseconds (corresponding to a frequency of about 60 MHz), and so on. The current flow superheats the gas inside the plasma containment tube into plasma.

The plasma may be ignited according to any means known in the art. For example, an electrode may be passed into the collection vessel via a pneumatic slide and charged with high voltage (e.g., about 100 kV) from a spark coil. The high voltage may produce a corona which conducts upward to the plasma collection vessel. The heat from the spark can then be used to ignite the plasma. The plasma plume may have any directional orientation but, in certain embodiments, may be a vertical plasma plume, as illustrated in the FIGURE. The core of the plasma can reach up to about 11,000K, whereas the outer edge of the plasma can be as low as 300K. The plasma plume may be at atmospheric pressure, in which case it may be characterized as an atmospheric pressure thermal plasma jet.

The glass batch materials may be fluidized by combining them with the plasma gas, e.g., the particles are entrained in the first gas. This stream may then be fed into the plasma containment vessel, where the first gas is converted into a plasma and the glass batch materials are delivered into the center of the plasma plume.

In certain non-limiting embodiments, a second gas may be injected into the plasma containment vessel, with a relatively high velocity in a direction tangential to the plasma plume, which produces a cyclonic flow around the plasma. The plasma and glass particles are twisted into a cyclonic pattern. Due to centrifugal force, which may be directly proportional to the second gas flow velocity, the particles may be pushed to the outer edge of the plasma plume where temperatures are relatively lower. The flow velocity of the second gas may vary depending on the desired throughput and may, in certain embodiments, range from about 10 SLPM to about 200 SLPM, for example, from about 30 SLPM to about 150 SLPM, or from about 50 to about 100 SLPM, including all ranges and sub-ranges therebetween.

Due to the cyclonic action, the glass batch materials can avoid long residence times in or near the higher temperature core where the particles could potentially vaporize. Additionally, the cyclone can drive the glass intermediate particles out of the plume and into a collection vessel, such as a hermetically sealed collection chamber. For instance, a fine mesh may be used to collect the particles. The particles may accumulate on the mesh for a period of collection, after which the mesh is shaken and/or blasted with inert gas to move the particles into the collection vessel. Any gas in the collection chamber can optionally be separated, filtered, and returned back to the beginning of the process.

Alternatively, the glass intermediate particles may flow into the collection vessel and may, in certain embodiments, be contacted with a tangential flow of a third gas. The tangential flow in the collection vessel may serve to induce a cyclonic flow pattern, which may promote cooling of the glass intermediate particles as they travel in the vessel and before they come to rest. The flow velocity of the third gas may vary depending on the desired cooling rate, in certain embodiments, range from about 10 SLPM to about 100 SLPM, for example, from about 15 SLPM to about 50 SLPM, or from about 20 to about 30 SLPM, including all ranges and sub-ranges therebetween.

The apparatus described herein may be operated under tightly contained conditions, which may provide for a product with a high degree of purity. In addition, the rapid thermal transfer achieved by using a plasma can dramatically reduce residence times for melting, thereby increasing throughput. The potential to eliminate or drastically reduce the time needed to stir the glass melt using traditional methods provides even further time and cost savings. Moreover, the plasma technology operates at a relatively low cost and is not prone to mechanical failures, thus decreasing down time and operational costs. Furthermore, the plasma technology provides a continuous process for melting the glass materials, as opposed to the traditionally slower batch processes. Finally, while prior art methods are aimed at fixing defects (e.g., bubbles, chord, and/or striae) after they have been produced, the methods disclosed herein prevent or substantially limit the formation of such defects, thereby eliminating or reducing the need for post-melt operations to remove defects.

Glass Intermediate Particles

The methods and apparatuses described herein provide a means to melt glass batch materials to form melted spheres having a mass similar to the original particles introduced into the plasma. The particles may be substantially homogeneous in terms of their chemical composition, substantially spheroid in shape, and may have a substantially smooth surface. The glass intermediate particles therefore may exhibit reduced clumping and bridging which is often observed in the original glass batch particles due to their jagged edges.

As used herein the terms "glass intermediate particles" and "glass pre-melt particles" and variations thereof are intended to denote substantially independent or separate particles which have been heated to a temperature sufficient to react and/or melt the glass batch material components to form a substantially homogenous particle. A "glass melt" can then be formed by combining the individual glass intermediate particles and optionally further heating and/or mixing to combine the particles into a homogenous melt.

As used herein the terms "homogeneous" and "substantially homogeneous" and variations thereof are intended to denote that the glass intermediate particle exhibits chemical homogeneity across a length scale approximately equal to its diameter. For instance, for an exemplary glass intermediate particle having an average particle size of 50 microns, the particle is substantially homogeneous across a length scale approximately equal to 50 microns. Likewise, glass intermediate particles having average particle sizes ranging from about 5 to about 1,000 microns may be homogeneous across a length scale ranging from about 5 to about 1,000 microns. For example, the glass intermediate particles may be homogeneous across a length scale ranging from about 50 microns to about 900 microns, from about 100 microns to about 800 microns, from about 150 microns to about 700 microns, from about 200 microns to about 600 microns, or from about 250 microns to 500 microns, and all ranges and subranges therebetween.

As used herein, the terms "spheroid" and "substantially spheroid" and variations thereof are intended to denote a shape which is substantially spherical, ovoid, or globular, although it is understood that the glass intermediate particles may have minor imperfections which prevent them from being perfectly spheroid in shape. It is also understood that each intermediate particle may vary in shape or size from the next particle.

As used herein, the terms "smooth" and "substantially smooth" and variations thereof are intended to denote a substantially even or regular surface which is substantially free of projections or indentations, such as jagged edges, sharp points, and/or lumps. Whereas the original glass batch materials may have jagged edges and/or surface irregularities which cause clumping and/or bridging, the glass intermediate particles have substantially smooth surfaces which may prevent or reduce clumping of the particles.

It will be appreciated that the chemical makeup of the glass intermediate particles will be the same or substantially similar to the chemical makeup of the glass batch materials, e.g., having the same ratio of components. It is therefore within the scope of the present disclosure that the glass intermediate particles have compositions as described above with reference to the makeup of the batch materials.

It will also be appreciated that the various disclosed embodiments may involve particular features, elements or steps that are described in connection with that particular embodiment. It will further be appreciated that a particular feature, element or step, although described in relation to one particular embodiment, may be interchanged or combined with alternate embodiments in various non-illustrated combinations or permutations.

It is to be understood that, as used herein the terms "the," "a," or "an," mean "at least one," and should not be limited to "only one" unless explicitly indicated to the contrary. Thus, for example, reference to "a gas" includes examples having two or more such "gases" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Various ranges are expressed herein as "greater than about" one or more particular values or "less than about" one or more particular values and "all ranges and sub-ranges therebetween." When such ranges are expressed, examples include from any one particular value to any other particular value. For instance, glass batch materials comprising greater than about 45 wt % of alumina, such as greater than about 50, 55, 60, 65, 70, 75, 80, 85, or 90 wt % include ranges of alumina from about 45 wt % to about 90 wt %, from about 65 wt % to about 80 wt %, and all other possible ranges between each disclosed value. Similarly, glass batch materials comprising less than about 55 wt % of at least one oxide, such as less than about 50, 45, 40, 35, 30, 25, 20, 15, or 10 wt % include ranges of oxide from about 10 wt % to about 55 wt %, from about 15 wt % to about 40 wt %, and all other possible ranges between each disclosed value.

All numerical values expressed herein are to be interpreted as including "about," whether or not so stated, unless expressly indicated otherwise. It is further understood, however, that each numerical value recited is precisely contemplated as well, regardless of whether it is expressed as "about" that value. Thus, "a temperature greater than 25° C." and "a temperature greater than about 25° C." both include embodiments of "a temperature greater than about 25° C." as well as "a temperature greater than 25° C."

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to glass batch materials that comprise certain elements include embodiments where the glass batch materials consist of those elements, and embodiments where the glass batch materials consist essentially of those elements.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for processing glass batch materials, comprising:
    bringing the glass batch materials into contact with a plasma for a residence time sufficient to react and melt the glass batch materials to form substantially homogeneous, spheroid-shaped glass intermediate particles, wherein the glass batch materials comprise from about 50 wt % to about 80 wt % collectively of at least one of alumina and silica, and from about 20 wt % to about 50 wt % collectively of at least one oxide of boron, magnesium, calcium, sodium, strontium, tin, and/or titanium.

2. The method of claim 1, wherein the glass batch materials further comprise at least one additional compound chosen from silicon nitride, silicon carbide, zirconia, and mixtures thereof.

3. The method of claim 1, wherein the glass batch materials comprise at least two of the oxides of boron, magnesium, calcium, sodium, strontium, tin and/or titanium.

4. The method of claim 1, further comprising mixing and/or sifting the glass batch materials prior to contact with the plasma.

5. The method of claim 1, wherein the glass batch materials have an average particle size ranging from about 5 to about 1,000 microns.

6. The method of claim 1, wherein the plasma is produced by heating at least one gas chosen from argon, air, helium, nitrogen, oxygen, and mixtures thereof, using a radio-frequency (RF) current.

7. The method of claim 1, wherein the plasma has a temperature ranging from about 9,000K to about 11,000K.

8. The method of claim 1, wherein the glass batch materials are entrained in a carrier gas chosen from argon, air, helium, nitrogen, oxygen, and mixtures thereof, when brought into contact with the plasma.

9. The method of claim 1, wherein the glass batch materials flow in a cyclonic pattern in the plasma.

10. The method of claim 1, further comprising cooling and/or collecting the glass intermediate particles, wherein the glass intermediate particles flow in a first direction, and wherein cooling comprises bringing the particles into contact with a flow of cooling gas having a second direction tangential to the first direction.

11. A method for melting glass batch materials comprising:
(a) bringing the glass batch materials into contact with a plasma for a residence time sufficient to react and melt the glass batch materials to form substantially homogeneous, spheroid-shaped glass intermediate particles, wherein the glass batch materials comprise from about 50 wt % to about 80 wt % collectively of at least one of alumina and silica, and from about 20 wt % to about 50 wt % collectively of at least one oxide of boron, magnesium, calcium, sodium, strontium, tin, and/or titanium;
(b) optionally cooling the glass intermediate particles;
(c) optionally collecting the glass intermediate particles; and
(d) heating the glass intermediate particles at a temperature and for a time sufficient to fuse the glass intermediate particles together to form a glass melt.

12. The method of claim 11, wherein the glass intermediate particles flow in a first direction, and wherein cooling the glass intermediate particles comprises bringing the particles into contact with a flow of cooling gas having a second direction tangential to the first direction.

13. A glass intermediate particle comprising:
at least one of alumina and silica, present in an amount ranging from about 50 wt % to about 80 wt % collectively, and at least one oxide of boron, magnesium, calcium, sodium, strontium, tin, and/or titanium, present in an amount ranging from about 20 wt % to about 50 wt % collectively, wherein:
(a) the glass intermediate particle is substantially homogeneous,
(b) the glass intermediate particle is substantially spheroid in shape,
(c) the glass intermediate particle has an average particle size ranging from about 5 microns to about 1,000 microns.

14. The glass intermediate particle of claim 13, further comprising at least one additional compound chosen from silicon nitride, silicon carbide, zirconia, and mixtures thereof.

15. The glass intermediate particle of claim 13, comprising at least two of the oxides of boron, magnesium, calcium, sodium, strontium, tin, and/or titanium.

16. The glass intermediate particle of claim 13, having a substantially smooth surface.

17. The glass intermediate particle of claim 13, which is substantially spherical in shape.

18. The glass intermediate particle of claim 13, having an average particle size ranging from about 50 to about 500 microns.

19. The glass intermediate particle of claim 13, comprising from about 49 to about 52 wt % silica and, from about 16 to about 21 wt % sodium oxide, and from about 28 to about 32 wt % calcium oxide.

20. A glass intermediate particle, comprising from about 50 to about 80 wt % alumina and from about 20 to about 50 wt % collectively of at least one of barium oxide or calcium oxide, wherein:
(a) the glass intermediate particle is substantially homogeneous,
(b) the glass intermediate particle is substantially spheroid in shape,
(c) the glass intermediate particle has an average particle size ranging from about 5 microns to about 1,000 microns.

* * * * *

UNITED STATES PATENT AND TRADEMARK OFFICE
CERTIFICATE OF CORRECTION

PATENT NO. : 10,059,614 B2
APPLICATION NO. : 15/026112
DATED : August 28, 2018
INVENTOR(S) : Daniel Robert Boughton et al.

It is certified that error appears in the above-identified patent and that said Letters Patent is hereby corrected as shown below:

On the Title Page

In Column 1, item (60), Related U.S. Application Data, Line 1, delete "61/886,519," and insert -- 61/886,819, --, therefor.

In Column 2, item (57), Abstract, Line 12, delete "V magnesium," and insert -- magnesium, --, therefor.

On page 2, Column 2, item (56), other publications, Line 1, delete "Seracing" and insert -- Searching --, therefor.

On page 2, Column 2, item (56), other publications, Line 21, delete "etal." and insert -- et al. --, therefor.

On page 2, Column 2, item (56), other publications, Line 33, delete "alkall" and insert -- alkali --, therefor.

Signed and Sealed this
Nineteenth Day of May, 2020

Andrei Iancu
*Director of the United States Patent and Trademark Office*